(12) United States Patent
Doucette et al.

(10) Patent No.: US 8,554,475 B2
(45) Date of Patent: Oct. 8, 2013

(54) STATIC AND DYNAMIC CONTOURS

(75) Inventors: Justin John Doucette, Glendale, CA (US); Karunanidhi Upparapalli, Diamond Bar, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 1273 days.

(21) Appl. No.: 11/906,277

(22) Filed: Oct. 1, 2007

(65) Prior Publication Data

US 2009/0087034 A1    Apr. 2, 2009

(51) Int. Cl.
*G06F 17/00* (2006.01)

(52) U.S. Cl.
USPC ........... 701/462; 701/400; 701/412; 701/461; 701/468; 382/113; 455/445

(58) Field of Classification Search
USPC .................. 382/113; 701/200, 209, 211, 212, 701/213, 208, 400, 412, 461, 462, 468
See application file for complete search history.

(56) References Cited

U.S. PATENT DOCUMENTS

| | | | |
|---|---|---|---|
| 4,086,632 A | 4/1978 | Lions | |
| 4,242,731 A | 12/1980 | Mizote et al. | |
| 4,244,514 A | 1/1981 | Nomura et al. | |
| 4,258,421 A | 3/1981 | Juhasz et al. | |
| 4,501,005 A | 2/1985 | Miller | |
| 4,523,283 A | 6/1985 | Muhlberger et al. | |
| 4,533,900 A | 8/1985 | Muhlberger et al. | |
| 4,591,844 A | 5/1986 | Hickin et al. | |
| 4,679,147 A | 7/1987 | Tsujii et al. | |
| 4,737,916 A | 4/1988 | Ogawa et al. | |
| 4,739,482 A | 4/1988 | Wrigge | |
| 4,782,447 A | 11/1988 | Ueno et al. | |
| 4,796,189 A | 1/1989 | Nakayama et al. | |
| 4,827,419 A | 5/1989 | Selby, III | |
| 4,827,438 A | 5/1989 | Nickles et al. | |
| 4,862,393 A | 8/1989 | Reid et al. | |
| 4,884,054 A | 11/1989 | Moon, Sr. | |
| 4,888,699 A | 12/1989 | Knoll et al. | |

(Continued)

FOREIGN PATENT DOCUMENTS

DE    3828224    2/1990
DE    4013851    11/1991

(Continued)

OTHER PUBLICATIONS

Transaction History of Provisional U.S. Appl. No. 61/122,640, filed Dec. 15, 2008, entitled "Systems and Methods for Providing Global Navigation Satellite System Assisted Maneuvering Guidance to a Vehicle Operator."

(Continued)

*Primary Examiner* — Thomas Black
*Assistant Examiner* — Wae Louie
(74) *Attorney, Agent, or Firm* — Winston Hsu; Scott Margo

(57) ABSTRACT

Methods and apparatus, including computer program products, for a static and dynamic contours. A method includes rendering a contour map including static contours and dynamic contours, and displaying the contour map on a device to a user. A Global Positioning System (GPS) device includes a processor coupled with an input device, memory, and the display, and the processor linked to a GPS receiver coupled with a GPS antenna, the memory including a vector source database, a parameter source database and a contour map process to render a topographic map comprising static contour lines and dynamic contour lines.

11 Claims, 5 Drawing Sheets

(56) References Cited

U.S. PATENT DOCUMENTS

| | | |
|---|---|---|
| 4,912,645 A | 3/1990 | Kakihara et al. |
| 4,914,571 A | 4/1990 | Baratz et al. |
| 4,914,605 A | 4/1990 | Loughmiller, Jr. et al. |
| 4,937,751 A | 6/1990 | Nimura et al. |
| 4,940,925 A | 7/1990 | Wand et al. |
| 4,951,212 A | 8/1990 | Kurihara et al. |
| 4,973,952 A | 11/1990 | Malec et al. |
| 4,984,168 A | 1/1991 | Neukrichnet et al. |
| 4,991,204 A | 2/1991 | Yamamoto et al. |
| 5,031,104 A | 7/1991 | Ikeda et al. |
| 5,043,902 A | 8/1991 | Yokoyama et al. |
| 5,043,908 A | 8/1991 | Manduley et al. |
| 5,046,011 A | 9/1991 | Kakihara et al. |
| 5,065,144 A | 11/1991 | Edleson et al. |
| 5,067,081 A | 11/1991 | Person |
| 5,075,693 A | 12/1991 | McMillan et al. |
| 5,089,826 A | 2/1992 | Tokunaga et al. |
| 5,093,669 A | 3/1992 | Kajiyama |
| 5,109,344 A | 4/1992 | Kakihara et al. |
| 5,113,185 A | 5/1992 | Ichikawa |
| 5,121,326 A | 6/1992 | Moroto et al. |
| 5,124,924 A | 6/1992 | Fukushima |
| 5,140,315 A | 8/1992 | Edelson et al. |
| 5,155,688 A | 10/1992 | Tanaka et al. |
| 5,168,451 A | 12/1992 | Bolger |
| 5,172,321 A | 12/1992 | Ghaem et al. |
| 5,177,685 A | 1/1993 | Davis et al. |
| 5,184,303 A | 2/1993 | Link |
| 5,208,756 A | 5/1993 | Song |
| 5,220,507 A | 6/1993 | Kirson |
| 5,223,844 A | 6/1993 | Mansell et al. |
| 5,243,528 A | 9/1993 | Lefebvre |
| 5,243,529 A | 9/1993 | Kashiwazaki |
| 5,247,356 A | 9/1993 | Ciampa |
| 5,262,775 A | 11/1993 | Tamai et al. |
| 5,263,174 A | 11/1993 | Layman |
| 5,274,358 A | 12/1993 | Janis |
| 5,274,560 A | 12/1993 | LaRue |
| 5,285,391 A | 2/1994 | Smith, Jr. et al. |
| 5,289,195 A | 2/1994 | Inoue |
| 5,291,413 A | 3/1994 | Tamai et al. |
| 5,291,414 A | 3/1994 | Tamai et al. |
| 5,293,163 A | 3/1994 | Kakihara et al. |
| 5,303,159 A | 4/1994 | Tamai et al. |
| 5,305,370 A | 4/1994 | Kearns et al. |
| 5,307,277 A | 4/1994 | Hirano |
| 5,307,278 A | 4/1994 | Hermans et al. |
| 5,307,290 A | 4/1994 | Raviglione et al. |
| 5,311,173 A | 5/1994 | Komura et al. |
| 5,311,434 A | 5/1994 | Tamai |
| 5,317,566 A | 5/1994 | Joshi |
| 5,334,974 A | 8/1994 | Simms et al. |
| 5,353,034 A | 10/1994 | Sato et al. |
| 5,359,527 A | 10/1994 | Takanabe et al. |
| 5,359,529 A | 10/1994 | Snider |
| 5,365,251 A | 11/1994 | Denber |
| 5,369,588 A | 11/1994 | Hayami et al. |
| 5,371,497 A | 12/1994 | Nimura et al. |
| 5,371,678 A | 12/1994 | Nomura |
| 5,381,338 A | 1/1995 | Wysocki et al. |
| 5,394,332 A | 2/1995 | Kuwahara et al. |
| 5,398,188 A | 3/1995 | Maruyama |
| 5,402,120 A | 3/1995 | Fujii et al. |
| 5,406,490 A | 4/1995 | Braegas |
| 5,406,492 A | 4/1995 | Suzuki |
| 5,410,485 A | 4/1995 | Ichikawa |
| 5,418,537 A | 5/1995 | Bird |
| 5,428,545 A | 6/1995 | Maegawa et al. |
| 5,428,546 A | 6/1995 | Shah et al. |
| 5,444,618 A | 8/1995 | Seki |
| 5,465,088 A | 11/1995 | Braegas |
| 5,465,089 A | 11/1995 | Nakatani et al. |
| 5,470,233 A | 11/1995 | Fruchterman et al. |
| 5,475,387 A | 12/1995 | Matsumoto |
| 5,479,602 A | 12/1995 | Baecker et al. |
| 5,485,161 A | 1/1996 | Vaughn |
| 5,495,416 A | 2/1996 | Buchwitz et al. |
| 5,497,149 A | 3/1996 | Fast |
| 5,499,181 A | 3/1996 | Smith |
| 5,504,482 A | 4/1996 | Schreder |
| 5,508,930 A | 4/1996 | Smith, Jr. et al. |
| 5,508,931 A | 4/1996 | Snider |
| 5,513,110 A | 4/1996 | Fujita et al. |
| 5,515,283 A | 5/1996 | Desai et al. |
| 5,521,826 A | 5/1996 | Matsumoto |
| 5,537,323 A | 7/1996 | Schulte |
| 5,539,397 A | 7/1996 | Asanuma |
| 5,543,789 A | 8/1996 | Behr et al. |
| 5,543,818 A | 8/1996 | Scott |
| 5,557,522 A | 9/1996 | Nakayama et al. |
| 5,557,524 A | 9/1996 | Maki |
| 5,559,511 A | 9/1996 | Ito et al. |
| 5,559,512 A | 9/1996 | Jasinski et al. |
| 5,559,707 A | 9/1996 | DeLorme et al. |
| 5,559,938 A | 9/1996 | Van Roekel et al. |
| 5,563,630 A | 10/1996 | Tsakiris et al. |
| 5,565,874 A | 10/1996 | Rode |
| 5,568,390 A | 10/1996 | Hirota et al. |
| 5,572,204 A | 11/1996 | Timm et al. |
| 5,579,443 A | 11/1996 | Tatematsu et al. |
| 5,581,593 A | 12/1996 | Engelke et al. |
| 5,583,494 A | 12/1996 | Mizutani et al. |
| 5,587,911 A | 12/1996 | Asano et al. |
| 5,592,389 A | 1/1997 | La Rue et al. |
| 5,602,564 A | 2/1997 | Iwamura et al. |
| 5,606,414 A | 2/1997 | Minden |
| 5,608,635 A | 3/1997 | Tamai |
| 5,612,882 A | 3/1997 | Lefebvre et al. |
| 5,613,055 A | 3/1997 | Shimoura et al. |
| 5,613,089 A | 3/1997 | Hornbuckle |
| 5,617,319 A | 4/1997 | Arakawa et al. |
| 5,625,668 A | 4/1997 | Loomis, V et al. |
| 5,627,549 A | 5/1997 | Park |
| 5,631,970 A | 5/1997 | Hsu |
| 5,638,279 A | 6/1997 | Kishi et al. |
| 5,638,280 A | 6/1997 | Nishimura et al. |
| 5,646,856 A | 7/1997 | Kaesser |
| 5,648,901 A | 7/1997 | Gudat et al. |
| 5,649,059 A | 7/1997 | Tendler et al. |
| 5,652,706 A | 7/1997 | Morimoto et al. |
| 5,654,892 A | 8/1997 | Fujii et al. |
| 5,654,908 A | 8/1997 | Yokoyama |
| 5,657,226 A | 8/1997 | Shin et al. |
| 5,661,476 A | 8/1997 | Wang et al. |
| 5,664,948 A | 9/1997 | Dimitriadis et al. |
| 5,682,525 A | 10/1997 | Bouve et al. |
| 5,684,476 A | 11/1997 | Anderson |
| 5,684,696 A | 11/1997 | Rao et al. |
| 5,684,704 A | 11/1997 | Okazaki |
| 5,686,886 A | 11/1997 | Stensey |
| 5,689,252 A | 11/1997 | Ayanoglu et al. |
| 5,689,667 A | 11/1997 | Kurtenbach |
| 5,699,244 A | 12/1997 | Clark et al. |
| 5,701,232 A | 12/1997 | Tang et al. |
| 5,706,448 A | 1/1998 | Blades |
| 5,712,632 A | 1/1998 | Nishimura et al. |
| 5,712,788 A | 1/1998 | Liaw et al. |
| 5,717,593 A | 2/1998 | Gvili |
| 5,719,771 A | 2/1998 | Buck et al. |
| 5,724,072 A | 3/1998 | Freeman et al. |
| 5,729,458 A | 3/1998 | Poppen |
| 5,731,766 A | 3/1998 | Akamatsu |
| 5,731,978 A | 3/1998 | Tamai et al. |
| 5,732,385 A | 3/1998 | Nakayama et al. |
| 5,739,772 A | 4/1998 | Nanba et al. |
| 5,742,277 A | 4/1998 | Gossett et al. |
| 5,742,666 A | 4/1998 | Alpert |
| 5,742,922 A | 4/1998 | Kim |
| 5,742,923 A | 4/1998 | Odagawa |
| 5,757,359 A | 5/1998 | Morimoto et al. |
| 5,764,014 A | 6/1998 | Jakeway et al. |
| 5,764,807 A | 6/1998 | Pearlman et al. |
| 5,774,073 A | 6/1998 | Maekawa et al. |
| 5,774,824 A | 6/1998 | Streit et al. |

| | | | | | | |
|---|---|---|---|---|---|---|
| 5,777,580 A | 7/1998 | Janky et al. | 6,067,502 A | 5/2000 | Hayashida et al. | |
| 5,777,875 A | 7/1998 | Miyano | 6,078,864 A | 6/2000 | Long et al. | |
| 5,790,243 A | 8/1998 | Herr | 6,081,609 A | 6/2000 | Narioka | |
| 5,793,310 A | 8/1998 | Watanabe et al. | 6,084,989 A * | 7/2000 | Eppler | 382/293 |
| 5,796,613 A | 8/1998 | Kato et al. | 6,092,076 A | 7/2000 | McDonough et al. | |
| 5,802,492 A | 9/1998 | DeLorme et al. | 6,107,944 A | 8/2000 | Behr et al. | |
| 5,805,167 A | 9/1998 | Van Cruyningen | 6,108,603 A | 8/2000 | Karunanidhi | |
| 5,808,564 A | 9/1998 | Simms et al. | 6,108,604 A | 8/2000 | Fakaga et al. | |
| 5,819,200 A | 10/1998 | Tamai et al. | 6,115,669 A | 9/2000 | Watanabe et al. | |
| 5,819,201 A | 10/1998 | DeGraaf | 6,124,826 A | 9/2000 | Garthwaite et al. | |
| 5,821,880 A | 10/1998 | Morimoto et al. | 6,125,326 A * | 9/2000 | Ohmura et al. | 701/454 |
| 5,825,306 A | 10/1998 | Hiyokawa et al. | 6,141,621 A | 10/2000 | Piwowarski et al. | |
| 5,828,321 A | 10/1998 | Matsuzaki | 6,148,261 A | 11/2000 | Obradovich et al. | |
| 5,832,408 A | 11/1998 | Tamai et al. | 6,151,552 A | 11/2000 | Koizumi et al. | |
| 5,835,881 A | 11/1998 | Trovato et al. | 6,154,699 A * | 11/2000 | Williams | 701/50 |
| 5,841,373 A | 11/1998 | Mason | 6,163,269 A | 12/2000 | Millington et al. | |
| 5,842,146 A | 11/1998 | Shishido | 6,172,641 B1 | 1/2001 | Millington | |
| 5,842,147 A | 11/1998 | Nimura et al. | 6,175,801 B1 | 1/2001 | Millington | |
| 5,845,227 A | 12/1998 | Peterson | 6,177,943 B1 | 1/2001 | Margolin | |
| 5,845,228 A | 12/1998 | Uekawa et al. | 6,178,380 B1 | 1/2001 | Millington | |
| 5,848,364 A | 12/1998 | Ohashi | 6,184,823 B1 | 2/2001 | Smith et al. | |
| 5,850,193 A | 12/1998 | Shimoura et al. | 6,189,130 B1 * | 2/2001 | Gofman et al. | 716/55 |
| 5,852,243 A | 12/1998 | Chang et al. | 6,201,540 B1 | 3/2001 | Gallup et al. | |
| 5,852,791 A | 12/1998 | Sato et al. | 6,204,778 B1 | 3/2001 | Bergan et al. | |
| 5,862,509 A | 1/1999 | Desai et al. | 6,205,397 B1 | 3/2001 | Eslambolchi et al. | |
| 5,862,510 A | 1/1999 | Saga et al. | 6,212,474 B1 | 4/2001 | Fowler et al. | |
| 5,862,511 A | 1/1999 | Croyle et al. | 6,223,118 B1 | 4/2001 | Kobayashi et al. | |
| 5,862,811 A | 1/1999 | Steele | 6,229,546 B1 | 5/2001 | Lancaster et al. | |
| 5,874,905 A | 2/1999 | Nanba et al. | 6,249,740 B1 | 6/2001 | Ito et al. | |
| 5,877,708 A | 3/1999 | Hijikata | 6,252,814 B1 | 6/2001 | Tran et al. | |
| 5,878,368 A | 3/1999 | DeGraaf | 6,253,151 B1 | 6/2001 | Ohler et al. | |
| 5,884,216 A | 3/1999 | Shah et al. | 6,256,029 B1 | 7/2001 | Millington | |
| 5,887,269 A | 3/1999 | Brunts et al. | 6,278,942 B1 | 8/2001 | McDonough | |
| 5,890,088 A | 3/1999 | Nimura et al. | 6,308,134 B1 | 10/2001 | Croyle et al. | |
| 5,892,441 A | 4/1999 | Woolley et al. | 6,320,517 B1 | 11/2001 | Yano et al. | |
| 5,893,898 A | 4/1999 | Tanimoto | 6,321,158 B1 | 11/2001 | DeLorme et al. | |
| 5,902,347 A | 5/1999 | Backman et al. | 6,349,257 B1 | 2/2002 | Liu et al. | |
| 5,902,349 A | 5/1999 | Endo et al. | 6,356,210 B1 | 3/2002 | Ellis | |
| 5,905,451 A | 5/1999 | Sakashita | 6,360,167 B1 | 3/2002 | Millington et al. | |
| 5,908,464 A | 6/1999 | Kishigami et al. | 6,362,751 B1 * | 3/2002 | Upparapalli | 340/995.19 |
| 5,911,775 A | 6/1999 | Tanimoto | 6,363,322 B1 | 3/2002 | Millington | |
| 5,919,246 A | 7/1999 | Waizmann et al. | 6,370,475 B1 | 4/2002 | Breed et al. | |
| 5,922,041 A | 7/1999 | Anderson | 6,377,278 B1 | 4/2002 | Cutright et al. | |
| 5,925,091 A | 7/1999 | Ando | 6,381,536 B1 | 4/2002 | Satoh et al. | |
| 5,928,307 A | 7/1999 | Oshizawa et al. | 6,385,535 B2 | 5/2002 | Ohishi et al. | |
| 5,929,857 A | 7/1999 | Dinallo et al. | 6,385,542 B1 | 5/2002 | Millington | |
| 5,935,193 A | 8/1999 | Saiki | 6,397,145 B1 | 5/2002 | Millington | |
| 5,936,553 A | 8/1999 | Kabel | 6,405,130 B1 | 6/2002 | Piwowarski | |
| 5,936,631 A | 8/1999 | Yano et al. | 6,408,243 B1 | 6/2002 | Yofu | |
| 5,938,719 A | 8/1999 | Arakawa et al. | 6,427,115 B1 | 7/2002 | Sekiyama | |
| 5,938,721 A | 8/1999 | Dussell et al. | 6,430,501 B1 | 8/2002 | Slominski | |
| 5,944,768 A | 8/1999 | Ito et al. | 6,453,235 B1 | 9/2002 | Endo et al. | |
| 5,948,040 A | 9/1999 | DeLorme et al. | 6,484,089 B1 | 11/2002 | Millington | |
| 5,951,621 A | 9/1999 | Palalau et al. | 6,487,494 B2 | 11/2002 | Odinak et al. | |
| 5,951,622 A | 9/1999 | Nomura | 6,515,595 B1 | 2/2003 | Obradovich et al. | |
| 5,961,570 A | 10/1999 | Inamori | 6,529,822 B1 | 3/2003 | Millington et al. | |
| 5,961,571 A | 10/1999 | Gorr et al. | 6,529,824 B1 | 3/2003 | Obradovich et al. | |
| 5,964,821 A | 10/1999 | Welk et al. | 6,539,301 B1 | 3/2003 | Shirk | |
| 5,968,109 A | 10/1999 | Israni et al. | 6,565,610 B1 | 5/2003 | Wang et al. | |
| 5,974,357 A | 10/1999 | Poonsaengsathit et al. | 6,574,551 B1 | 6/2003 | Maxwell et al. | |
| 5,978,732 A | 11/1999 | Kakitani et al. | 6,609,062 B2 | 8/2003 | Hancock | |
| 5,978,804 A | 11/1999 | Dietzman | 6,631,322 B1 | 10/2003 | Arthur et al. | |
| 5,982,301 A | 11/1999 | Ohta et al. | 6,671,617 B2 | 12/2003 | Odinak et al. | |
| 5,982,325 A | 11/1999 | Thornton et al. | 6,704,649 B2 | 3/2004 | Miyahara | |
| 5,983,158 A | 11/1999 | Suzuki et al. | 6,728,608 B2 | 4/2004 | Ollis et al. | |
| 5,987,375 A | 11/1999 | Tamai | 6,728,636 B2 | 4/2004 | Kokijima et al. | |
| 5,988,853 A | 11/1999 | Kim et al. | 6,748,323 B2 | 6/2004 | Lokshin | |
| 5,991,690 A | 11/1999 | Murphy | 6,765,554 B2 | 7/2004 | Millington | |
| 6,005,578 A | 12/1999 | Cole | 6,774,932 B1 | 8/2004 | Ewing | |
| 6,016,142 A | 1/2000 | Chang et al. | 6,782,319 B1 | 8/2004 | McDonough | |
| 6,023,278 A | 2/2000 | Margolin | 6,816,596 B1 | 11/2004 | Peinado et al. | |
| 6,028,537 A | 2/2000 | Suman et al. | 6,819,301 B1 | 11/2004 | Nagamatsu et al. | |
| 6,029,111 A | 2/2000 | Croyle | 6,842,695 B1 | 1/2005 | Tu | |
| 6,031,471 A | 2/2000 | Wilson | 6,873,907 B1 | 3/2005 | Millington et al. | |
| 6,037,942 A | 3/2000 | Millington | 6,885,874 B2 | 4/2005 | Grube et al. | |
| 6,043,760 A | 3/2000 | Laakkonen | 6,904,361 B1 * | 6/2005 | Tallman et al. | 703/1 |
| 6,047,235 A | 4/2000 | Hiyokawa et al. | 6,917,982 B1 | 7/2005 | Dueck et al. | |
| 6,049,753 A | 4/2000 | Nimura | 6,920,391 B2 * | 7/2005 | Daubert et al. | 701/400 |
| 6,049,755 A | 4/2000 | Lou et al. | 6,938,028 B1 | 8/2005 | Ito | |

| | | | |
|---|---|---|---|
| 7,031,834 B2 * | 4/2006 | Ito et al. ............... 701/455 |
| 7,031,836 B2 | 4/2006 | Branch |
| 7,058,504 B2 * | 6/2006 | McDonough ............ 701/532 |
| 7,164,883 B2 * | 1/2007 | Rappaport et al. ........ 455/3.01 |
| 7,170,518 B1 | 1/2007 | Millington et al. |
| 7,171,208 B2 * | 1/2007 | Rappaport et al. .......... 455/445 |
| 7,233,860 B2 | 6/2007 | Lokshin et al. |
| 7,246,045 B1 * | 7/2007 | Rappaport et al. ............ 703/2 |
| 7,260,475 B2 | 8/2007 | Suzuki |
| 7,286,971 B2 * | 10/2007 | Rappaport et al. ............ 703/2 |
| 7,321,826 B2 | 1/2008 | Sheha et al. |
| 7,333,820 B2 | 2/2008 | Sheha et al. |
| 7,343,242 B2 | 3/2008 | Breitenberger et al. |
| 7,353,107 B2 | 4/2008 | Breitenberger et al. |
| 7,379,812 B2 | 5/2008 | Yoshioka et al. |
| 7,421,334 B2 | 9/2008 | Dahlgren |
| 7,512,487 B1 | 3/2009 | Golding et al. |
| 7,590,490 B2 | 9/2009 | Clark |
| 7,660,441 B2 * | 2/2010 | Chen et al. ................ 382/113 |
| 7,697,202 B2 | 4/2010 | Ohishi et al. |
| 7,889,888 B2 * | 2/2011 | Deardorff et al. ......... 382/113 |
| 2001/0018628 A1 | 8/2001 | Jenkins et al. |
| 2002/0087857 A1 | 7/2002 | Tsao et al. |
| 2002/0151315 A1 | 10/2002 | Hendrey |
| 2003/0036842 A1 | 2/2003 | Hancock |
| 2003/0036848 A1 | 2/2003 | Sheha et al. |
| 2003/0167120 A1 | 9/2003 | Kawasaki |
| 2003/0182052 A1 | 9/2003 | DeLorme et al. |
| 2003/0191578 A1 | 10/2003 | Paulauskas et al. |
| 2003/0216949 A1 | 11/2003 | Kram |
| 2004/0039520 A1 | 2/2004 | Khavakh et al. |
| 2004/0090346 A1 | 5/2004 | Simonds |
| 2004/0190715 A1 | 9/2004 | Nimura et al. |
| 2005/0107948 A1 | 5/2005 | Catalinotto |
| 2005/0136949 A1 | 6/2005 | Barnes, Jr. |
| 2005/0163055 A1 | 7/2005 | Hagimura |
| 2006/0009234 A1 | 1/2006 | Freer |
| 2006/0058949 A1 | 3/2006 | Fogel et al. |
| 2006/0080031 A1 | 4/2006 | Cooper et al. |
| 2006/0089788 A1 | 4/2006 | Laverty |
| 2006/0106534 A1 | 5/2006 | Kawamata et al. |
| 2006/0212217 A1 | 9/2006 | Sheha et al. |
| 2006/0240808 A1 | 10/2006 | Crolley |
| 2006/0265422 A1 | 11/2006 | Ando et al. |
| 2007/0016360 A1 | 1/2007 | Lee et al. |
| 2007/0027628 A1 | 2/2007 | Geelen |
| 2007/0073480 A1 | 3/2007 | Singh |
| 2007/0088494 A1 | 4/2007 | Rothman et al. |
| 2007/0130153 A1 | 6/2007 | Nachman et al. |
| 2007/0162223 A1 | 7/2007 | Clark |
| 2007/0179863 A1 | 8/2007 | Stoll |
| 2007/0200821 A1 | 8/2007 | Contradt et al. |
| 2007/0204218 A1 | 8/2007 | Weber et al. |
| 2007/0213929 A1 | 9/2007 | Tanizaki et al. |
| 2007/0233384 A1 | 10/2007 | Lee et al. |
| 2007/0250515 A1 | 10/2007 | Lea |
| 2007/0281690 A1 | 12/2007 | Altman et al. |
| 2007/0293958 A1 | 12/2007 | Stehle et al. |
| 2008/0051995 A1 | 2/2008 | Lokshin et al. |
| 2008/0076451 A1 | 3/2008 | Sheha et al. |
| 2008/0125958 A1 | 5/2008 | Boss et al. |
| 2008/0133120 A1 | 6/2008 | Romanick |
| 2008/0134088 A1 | 6/2008 | Tse et al. |
| 2008/0139181 A1 | 6/2008 | Lokshin et al. |
| 2008/0177470 A1 | 7/2008 | Sutardja |
| 2008/0198162 A1 | 8/2008 | Ni |
| 2008/0221787 A1 | 9/2008 | Vavrus |
| 2008/0262728 A1 | 10/2008 | Lokshin et al. |
| 2008/0270016 A1 | 10/2008 | Proietty et al. |
| 2008/0270468 A1 | 10/2008 | Mao |
| 2009/0070293 A1 | 3/2009 | Vechersky |
| 2009/0087034 A1 * | 4/2009 | Doucette et al. ............ 382/113 |
| 2009/0138190 A1 | 5/2009 | Kulik |
| 2009/0150064 A1 | 6/2009 | Geelen |
| 2009/0171584 A1 | 7/2009 | Liu |
| 2009/0182498 A1 | 7/2009 | Seymour |
| 2009/0182500 A1 | 7/2009 | Dicke |
| 2009/0187340 A1 | 7/2009 | Vavrus |
| 2009/0187341 A1 | 7/2009 | Vavrus |
| 2009/0187342 A1 | 7/2009 | Vavrus |

FOREIGN PATENT DOCUMENTS

| | | |
|---|---|---|
| DE | 4323081 | 3/1995 |
| DE | 4343871 | 6/1995 |
| DE | 4428928 | 2/1996 |
| DE | 19516647 | 11/1996 |
| DE | 19728470 | 1/1999 |
| DE | 69931622 | 5/2007 |
| DE | 102007028361 | 3/2008 |
| EP | 0478438 | 4/1992 |
| EP | 0566228 | 10/1993 |
| EP | 0582536 | 2/1994 |
| EP | 0633452 | 1/1995 |
| EP | 0440105 | 4/1995 |
| EP | 0704676 | 4/1996 |
| EP | 0339639 | 6/1996 |
| EP | 0860688 | 8/1998 |
| EP | 0875729 | 11/1998 |
| EP | 0896315 | 2/1999 |
| EP | 0978707 | 2/2000 |
| EP | 0987910 | 3/2000 |
| EP | 1005006 | 5/2000 |
| EP | 0660083 | 9/2000 |
| EP | 1035530 | 9/2000 |
| EP | 0738876 | 11/2002 |
| EP | 0767448 | 12/2002 |
| EP | 0720003 | 7/2003 |
| EP | 1078222 | 9/2003 |
| EP | 1078224 | 10/2003 |
| EP | 1078225 | 10/2003 |
| EP | 0779498 | 11/2003 |
| EP | 1394654 | 3/2004 |
| EP | 1056988 | 4/2004 |
| EP | 1471330 | 10/2004 |
| EP | 0803708 | 11/2004 |
| EP | 1498864 | 1/2005 |
| EP | 0829704 | 11/2005 |
| EP | 1074002 | 11/2005 |
| EP | 1070229 | 5/2006 |
| EP | 1018079 | 9/2006 |
| EP | 1250566 | 9/2006 |
| EP | 1012743 | 11/2006 |
| EP | 1254349 | 11/2006 |
| EP | 1080342 | 1/2009 |
| FR | 2674652 | 10/1992 |
| FR | 2691276 | 11/1993 |
| FR | 2743168 | 7/1997 |
| FR | 2905810 | 3/2008 |
| GB | 2260210 | 4/1993 |
| GB | 2333838 | 8/1999 |
| GB | 2334102 | 8/1999 |
| GB | 2441609 | 3/2008 |
| JP | 2140788 | 5/1990 |
| JP | 3211591 | 9/1991 |
| JP | 6034382 | 2/1994 |
| JP | 6251292 | 9/1994 |
| JP | 7286856 | 10/1995 |
| JP | 8069515 | 3/1996 |
| JP | 8138193 | 5/1996 |
| JP | 8146871 | 6/1996 |
| JP | 8190574 | 7/1996 |
| JP | 8305283 | 11/1996 |
| JP | 9115097 | 5/1997 |
| JP | 9138132 | 5/1997 |
| JP | 9171348 | 6/1997 |
| JP | 9288445 | 11/1997 |
| JP | 9292829 | 11/1997 |
| JP | 9318380 | 12/1997 |
| JP | 9329449 | 12/1997 |
| JP | 10026538 | 1/1998 |
| JP | 2001194172 | 7/2001 |
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |

| | | |
|---|---|---|
| KR | 19990011004 | 2/1999 |
| KR | 19990040849 | 6/1999 |
| KR | 20010088887 | 9/2001 |
| KR | 20020018134 | 3/2002 |
| KR | 20020084716 | 11/2002 |
| KR | 20040033181 | 4/2004 |
| KR | 20040037651 | 5/2004 |
| KR | 20040063088 | 7/2004 |
| KR | 20040106688 | 12/2004 |
| KR | 20050068971 | 7/2005 |
| KR | 20050116855 | 12/2005 |
| KR | 20060028237 | 3/2006 |
| KR | 20060101929 | 9/2006 |
| KR | 20070080726 | 8/2007 |
| WO | 9802793 | 1/1998 |
| WO | 9914684 | 3/1999 |
| WO | 9946563 | 9/1999 |
| WO | 9954848 | 10/1999 |
| WO | 9957517 | 11/1999 |
| WO | 9957518 | 11/1999 |
| WO | 9957519 | 11/1999 |
| WO | 9957520 | 11/1999 |
| WO | 9957521 | 11/1999 |
| WO | 9964823 | 12/1999 |
| WO | 0008556 | 2/2000 |
| WO | 0045130 | 8/2000 |
| WO | 0074019 | 12/2000 |
| WO | 0146650 | 6/2001 |
| WO | 0153777 | 7/2001 |
| WO | 0223129 | 3/2002 |
| WO | 0233355 | 4/2002 |
| WO | 0235182 | 5/2002 |
| WO | 0237446 | 5/2002 |
| WO | 02086735 | 10/2002 |
| WO | 2004011882 | 2/2004 |
| WO | 2008070226 | 6/2008 |
| WO | 2008073717 | 6/2008 |
| WO | 2008100656 | 8/2008 |
| WO | 2008112335 | 9/2008 |
| WO | 2008130722 | 10/2008 |
| WO | 2008134093 | 11/2008 |
| WO | 2009036052 | 3/2009 |

OTHER PUBLICATIONS

International Patent Application PCT/US08/50759, International Search Report and Written Opinion (mailed May 9, 2008).
International Patent Application PCT/US07/76733, International Search Report and Written Report (mailed Aug. 20, 2008).
Jagadeesh, G. et al., "Heuristic Techniques for Accelerating Hierarchical Routing on Road Networks," IEEE Transactions on Intelligent Transportation Systems, IEEE Service Center, vol. 3, No. 4, Dec. 2002, p. 307.
International Patent Application PCT/US08/51019, International Search Report and Written Opinion (mailed Jun. 26, 2008).
International Patent Application PCT/US08/75839, International Search Report and Written Opinion (mailed Mar. 19, 2009).
Atlas Cartographic technologies Ltd., "reLive! User Manual," located at http://relive.abmaps.com/map/ , 2006.
Auto Nav 2000 Plus, Inc., "750NAV™ & 750M™ Features & Benefits," located at http://www.autonav2000.com/features.htm, 2000.
Berntson, G., "Mobitex—A New Network for Mobile Data Communications," Ericsoon Review, vol. 66, No. 1, Jan. 1989, Stockholm, SE, pp. 33-39.
Dingus, T.A., "Human Factors Engineering the Travtek Driver Interface," Proceedings of the Vehicle Navigation and Information Systems Conference, vol. 2, Oct. 20, 1991, pp. 749-755.
First Conference Ltd., "Navigation & Location 2007," conference schedule, located at http://www.telematicsupdate.com/navUSA2007/agenda.shtml , Dec. 2007.
Guzolek, John et al., "Real-Time Route Planning in Road Networks," Vehicle Navigation and Information Systems Conference, Sep. 11-13, 1989, pp. 165-169.
International Patent Application PCT/US00/00072, International Search Report (mailed Aug. 18, 2000).
International Patent Application PCT/US00/41590, International Search Report (mailed May 14, 2001).
International Patent Application PCT/US00/41590, Written Opinion.
International Patent Application PCT/US01/32531, International Search Report (mailed Jul. 7, 2002).
International Patent Application PCT/US01/41889, International Search Report (mailed Apr. 8, 2002).
International Patent Application PCT/US03/23777, International Search Report (mailed Dec. 10, 2003).
International Patent Application PCT/US07/85936, International Search Report and Written Opinion (mailed Nov. 6, 2008).
International Patent Application PCT/US08/50650, International Search Report and Written Opinion (mailed May 13, 2008).
International Patent Application PCT/US08/50760, International Search Report and Written Opinion (mailed May 13, 2008).
International Patent Application PCT/US08/50764, International Search Report and Written Opinion (mailed Sep. 29, 2008).
International Patent Application PCT/US96/20852, International Search Report and Written Opinion (mailed ).
International Patent Application PCT/US97/16552, International Search Report (mailed Jan. 9, 1998).
International Patent Application PCT/US99/03870, International Search Report (mailed Jul. 28, 1999).
International Patent Application PCT/US99/07911, International Search Report (mailed Jul. 30, 1999).
International Patent Application PCT/US99/08459, International Search Report (mailed Sep. 3, 1999).
International Patent Application PCT/US99/08462, International Search Report (mailed Sep. 17, 1999).
International Patent Application PCT/US99/08589, International Search Report (mailed Sep. 7, 1999).
International Patent Application PCT/US99/08776, International Search Report (mailed Sep. 15, 1999).
International Patent Application PCT/US99/08776, Written Opinion (mailed Feb. 10, 2000).
International Patent Application PCT/US99/09779, International Search Report (mailed Oct. 12, 1999).
International Patent Application PCT/US99/12575, International Search Report (mailed Sep. 29, 1999).
International Patent Application PCT/US99/12575, Written Opinion (mailed Apr. 2000).
Magellan Navigation, Inc., "Magellan Maestro™ 4000 User Manual," 2007.
Magellan, "1997 Magellan Products Anywhere to Anywhere Satellite Navigation and Communication," 1997, pp. 1-20.
Magellan, Magellan PathMaster Turn-by-Turn Route Guidance & Driver Information System, pp. 1-4.
Martin, Scott, "Connected GPS Unit Roadmap—The Next Generation," GPSLodge, located at http://www.gpslodge.com/archives/015915.php , Jan. 6, 2006.
Navteq, "NAVTEQ Announces European Winners of Global LBS Challenge™, Drives Location and Navigation on Wireless Devices," located at http://www.navteq.com/webapps/NewsUserServlet?action+NewsDetail&newsId=500 , Feb. 13, 2007.
Privat, Ludovic, "uLocate Acquires Web Start-Up Zynce," GPS Business News, located at http://www.gpsbusinessnews.com/index.php?action=article&numero=649&TOKEN_RETURN , Feb. 13, 2008.
Sloane, Julie, "Top 10 Startups Worth Watching in 2008," Wired Magazine, located at http://www.wired.com/print/techbiz/startups/news/2007/12/YE_10_startups , Dec. 24, 2007.
Tellmewhere.com , company information located at http://www.tellmewhere.com , 2007.
Thales Navigation, "Mobile Mapper," User Manual, Jul. 2003, pp. 1-120.
Tilefile Ltd., company information located at http://www.tilefile.com/tour/ , 2007.
uLocate Communications, Inc., "Zync," product information located at http://www.zync.com/ , 2008.
International Patent Application PCT/US08/77389, International Search Report and Written Opinion (mailed Mar. 31, 2009).
Transaction History of U.S. Appl. No. 08/691,663, filed Aug. 2, 1996, entitled "Method Providing a Textual Description of a Remote Vehicle Location," now U.S. Patent No. 6,141,621.

Transaction History of U.S. Appl. No. 08/691,727, filed Aug. 2, 1996, entitled "System and Method for Controlling a Vehicle Emergency Response Network," now U.S. Patent No. 6,539,301.
Transaction History of U.S. Appl. No. 08/710,473, filed Sep. 18, 1996, entitled "Navigation Simulator and Recorder," now U.S. Patent No. 5,922,041.
Transaction History of U.S. Appl. No. 08/713,625, filed Sep. 13, 1996, entitled "Navigation System With Vehicle Service Information," now U.S. Patent No. 5,819,201.
Transaction History of U.S. Appl. No. 08/713,627, filed Sep. 13, 1996, entitled "Navigation System With User Definable Cost Values," now U.S. Patent No. 5,878,368.
Transaction History of U.S. Appl. No. 08/762,012, filed Dec. 11, 1996, entitled "Navigation System With Forward Looking Origin Selection for Route Re-Calculation," now U.S. Patent No. 6,405,130.
Transaction History of U.S. Appl. No. 09/037,772, filed Mar. 10, 1998, entitled "Navigation System Character Input Device," now U.S. Patent No. 6,037,942.
Transaction History of U.S. Appl. No. 09/056,218, filed Apr. 7, 1998, entitled "Navigation System using Position Network for Map Matching," now U.S. Patent No. 6,108,603.
Transaction History of U.S. Appl. No. 09/062,518, filed Apr. 17, 1998, entitled "3-Dimensional Intersection Display for Vehicle Navigation System," now U.S. Patent No. 6,611,753.
Transaction History of U.S. Appl. No. 09/096,103, filed Jun. 11, 1998, entitled "Navigation System With a Route Exclusion List System," now U.S. Patent No. 6,362,751.
Transaction History of U.S. Appl. No. 09/099,963, filed Jun. 19, 1998, entitled "Autoscaling of Recommended Route," now U.S. Patent No. 6,574,551.
Transaction History of U.S. Appl. No. 09/100,683, filed Jun. 19, 1998, entitled "Navigation System Map Panning Directional Indicator," now U.S. Patent No. 6,175,801.
Transaction History of U.S. Appl. No. 09/114,670, filed Jul. 13, 1998, entitled "Navigation System Vehicle Location Display," now U.S. Patent No. 6,049,755.
Transaction History of U.S. Appl. No. 09/118,030, filed Jul. 17, 1998, entitled "Navigation System With Predetermined Indication of Next Maneuver," now U.S. Patent No. 6,078,684.
Transaction History of U.S. Appl. No. 09/160,068, filed Sep. 24, 1998, entitled "Navigation System With Anti-Alias Map Display," now U.S. Patent No. 6,163,269.
Transaction History of U.S. Appl. No. 09/176,630, filed Oct. 22, 1998, entitled "Street Identification for a Map Zoom of a Navigation System," now U.S. Patent No. 6,178,380.
Transaction History of U.S. Appl. No. 09/239,692, filed Jan. 29, 1999, entitled "Vehicle Navigation System With Location Based Multi-Media Annotation," now U.S. Patent No. 6,360,167.
Transaction History of U.S. Appl. No. 09/418,749, filed Oct. 15, 1999, entitled "Navigation System With Road Condition Sampling," now U.S. Patent No. 6,484,089.
Transaction History of U.S. Appl. No. 09/435,381, filed Nov. 5, 1999, entitled "Navigation System Character Input Device," now U.S. Patent No. 6,765,554.
Transaction History of U.S. Appl. No. 09/470,438, filed Dec. 22, 1999, entitled "Navigation System With All Character Support," now U.S. Patent No. 6,256,029.
Transaction History of U.S. Appl. No. 09/470,441, filed Dec. 22, 1999, entitled "Navigation System With Unique Audio Tones for Maneuver Notification," now U.S. Patent No. 6,363,322.
Transaction History of U.S. Appl. No. 09/487,654, filed Jan. 19, 2000, entitled "Navigation System With Route Indicators," now U.S. Patent No. 6,430,501.
Transaction History of U.S. Appl. No. 09/519,143, filed Mar. 6, 2000, entitled "Navigation System With Complex Maneuver Instruction," now U.S. Patent No. 6,397,145.
Transaction History of U.S. Appl. No. 09/535,733, filed Mar. 27, 2000, entitled "Selective Rendering of Cartographic Entities for Navigation System," now U.S. Patent No. 7,170,518.
Transaction History of U.S. Appl. No. 09/547,004, filed Apr. 11, 2000, entitled "Navigation System With Zoomed Maneuver Instruction," now U.S. Patent No. 6,529,822.

Transaction History of U.S. Appl. No. 09/661,982, filed Sep. 18, 2000, entitled "Points of Interest for Navigation System," now U.S. Patent No. 6,374,180.
Transaction History of U.S. Appl. No. 09/679,671, filed Oct. 5, 2000, entitled "Navigation System With Run-Time Training Instruction," now abandoned.
Transaction History of U.S. Appl. No. 09/691,531, filed Oct. 18, 2000, entitled "Multiple Configurations for a Vehicle Navigation System," now U.S. Patent No. 6,385,542.
Transaction History of U.S. Appl. No. 09/799,876, filed Mar. 6, 2001, entitled "Navigation System With Figure of Merit Determination," now U.S. Patent No. 6,741,928.
Transaction History of U.S. Appl. No. 10/088,017, filed Sep. 9, 2002, entitled "Navigation System With User Interface," now U.S. Patent No. 6,873,907.
Transaction History of U.S. Appl. No. 10/208,261, filed Jul. 31, 2002, entitled "Displaying Data," now U.S. Patent No. 6,748,323.
Transaction History of U.S. Appl. No. 10/619,619, filed Jul. 16, 2003, entitled "Intelligent Modular Navigation Information Capability," now U.S. Patent No. 7,233,860.
Transaction History of U.S. Appl. No. 11/327,450, filed Jan. 9, 2006, entitled "Smart Detour."
Transaction History of U.S. Appl. No. 11/518,205, filed Sep. 11, 2006, entitled "Method and System of Securing Content and Destination of Digital Download Via the Internet."
Transaction History of U.S. Appl. No. 11/675,817, filed Feb. 16, 2007, entitled "A Method of Generating Curved Baseline for Map Labeling."
Transaction History of U.S. Appl. No. 11/684,301, filed Mar. 9, 2007, entitled "Method and Apparatus for Determining a Route Having an Estimated Minimum Fuel Usage for a Vehicle."
Transaction History of U.S. Appl. No. 11/737,125, filed Apr. 18, 2007, entitled "Method and System Navigation Using Gps Velocity Vector."
Transaction History of U.S. Appl. No. 11/740,280, filed Apr. 25, 2007, entitled "Adjusting Spatial Operations Based on Map Density."
Transaction History of U.S. Appl. No. 11/840,610, filed Aug. 17, 2007, entitled "Methods and Apparatus for Measuring the Effectiveness of Advertisements Presented on a Mobile Navigation Device."
Transaction History of U.S. Appl. No. 11/844,321, filed Aug. 23, 2007, entitled "Rerouting in Vehicle Navigation Systems."
Transaction History of U.S. Appl. No. 11/852,973, filed Sep. 10, 2007, entitled "Nearest Neighbor Geographic Search."
Transaction History of U.S. Appl. No. 11/906,277, filed Oct. 1, 2007, entitled "Static and Dynamic Contours."
Transaction History of U.S. Appl. No. 11/945,211, filed Nov. 26, 2007, entitled "System and Method of Providing Traffic Data to a Mobile Device."
Transaction History of U.S. Appl. No. 11/967,889, filed Jan. 1, 2008, entitled "System and Method for Accessing a Navigation System."
Transaction History of U.S. Appl. No. 12/016,949, filed Jan. 18, 2008, entitled "Method and Apparatus for Hybrid Routing Using Breadcrumb Paths."
Transaction History of U.S. Appl. No. 12/016,980, filed Jan. 18, 2008, entitled "Method and Apparatus to Search for Local Parking."
Transaction History of U.S. Appl. No. 12/016,982, filed Jan. 18, 2008, entitled "Method and Apparatus for Access Point Recording Using a Position Device."
Transaction History of U.S. Appl. No. 12/188,139, filed Aug. 7, 2008, entitled "System and Method to Record a Present Trip."
Transaction History of U.S. Appl. No. 12/192,018, filed Aug. 14, 2008, entitled "Route Navigation via a Proximity Point."
Transaction History of U.S. Appl. No. 12/195,152, filed Aug. 20, 2008, entitled "Systems and Methods for Smart City Search."
International Patent Application No. PCT/US2008/084659, Written Opinion and International Search Report, Apr. 28, 2009.
International Patent Application No. PCT/US2009/030177, Writtten Opinion and International Search Report, Apr. 29, 2009.
International Patent Application No. PCT/US2009/030314, Written Opinion and International Search Report, May 25, 2009.
Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.

Transaction History of related U.S. Appl. No. 08/713,627, filed Sep. 13, 1996, entitled "Navigation System With User Definable Cost Values," now U.S. Patent No. 5,878,368.

Transaction History of related U.S. Appl. No. 08/762,012, filed Dec. 11, 1996, entitled "Navigation System With Forward Looking Origin Selection for Route Re-Calculation," now U.S. Patent No. 6,405,130.

Transaction History of related U.S. Appl. No. 09/037,772, filed Mar. 10, 1998, entitled "Navigation System Character Input Device," now U.S. Patent No. 6,037,942.

Transaction History of relatedU.S. Appl. No. 09/056,218, filed Apr. 7, 1998, entitled "Navigation System using Position Network for Map Matching," now U.S. Patent No. 6,108,603.

Transaction History of related U.S. Appl. No. 09/062,518, filed Apr. 17, 1998, entitled "3- Dimensional Intersection Display for Vehicle Navigation System," now U.S. Patent No. 6,611,753.

Transaction History of related U.S. Appl. No. 09/096,103, filed Jun. 11, 1998, entitled "Navigation System With a Route Exclusion List System," now U.S. Patent No. 6,362,751.

Transaction History of related U.S. Appl. No. 09/099,963, filed Jun. 19, 1998, entitled "Autoscaling of Recommended Route," now U.S. Patent No. 6,574,551.

Transaction History of related U.S. Appl. No. 09/100,683, filed Jun. 19, 1998, entitled "Navigation System Map Panning Directional Indicator," now U.S. Patent No. 6,175,801.

Transaction History of related U.S. Appl. No. 09/114,670, filed Jul. 13, 1998, entitled "Navigation System Vehicle Location Display," now U.S. Patent No. 6,049,755.

Transaction History of related U.S. Appl. No. 09/118,030, filed Jul. 17, 1998, entitled "Navigation System With Predetermined Indication of Next Maneuver," now U.S. Patent No. 6,078,684.

Transaction History of related U.S. Appl. No. 09/160,068, filed Sep. 24, 1998, entitled "Navigation System With Anti-Alias Map Display," now U.S. Patent No. 6,163,269.

Transaction History of related U.S. Appl. No. 09/176,630, filed Oct. 22, 1998, entitled "Street Identification for a Map Zoom of a Navigation System," now U.S. Patent No. 6,178,380.

Transaction History of related U.S. Appl. No. 09/239,692, filed Jan. 29, 1999, entitled "Vehicle Navigation System With Location Based Multi-Media Annotation," now U.S. Patent No. 6,360,167.

Transaction History of related U.S. Appl. No. 09/418,749, filed Oct. 15, 1999, entitled "Navigation System With Road Condition Sampling," now U.S. Patent No. 6,484,089.

Transaction History of related U.S. Appl. No. 091435,381, filed Nov. 5, 1999, entitled "Navigation System Character Input Device," now U.S. Patent No. 6,765,554.

Transaction History of related U.S. Appl. No. 09/470,438, filed Dec. 22, 1999, entitled "Navigation System With All Character Support," now U.S. Patent No. 6,256,029.

Transaction History of related U.S. Appl. No. 09/470,441, filed Dec. 22, 1999, entitled "Navigation System With Unique Audio Tones for Maneuver Notification," now U.S. Patent No. 6,363,322.

Transaction History of related U.S. Appl. No. 09/487,654, filed Jan. 19, 2000, entitled "Navigation System With Route Indicators," now U.S. Patent No. 6,430,501.

Transaction History of related U.S. Appl. No. 09/519,143, filed Mar. 6, 2000, entitled "Navigation System With Complex Maneuver Instruction," now U.S. Patent No. 6,397,145.

Transaction History of related U.S. Appl. No. 09/535,733, filed Mar. 27, 2000, entitled "Selective Rendering of Cartographic Entities for Navigation System," now U.S. Patent No. 7,170,518.

Transaction History of related U.S. Appl. No. 09/547,004, filed Apr. 11, 2000, entitled "Navigation System With Zoomed Maneuver Instruction," now U.S. Patent No. 6,529,822.

Transaction History of related U.S. Appl. No. 09/661,982, filed Sep. 18, 2000, entitled "Points of Interest for Navigation System," now U.S. Patent No. 6,374,180.

Transaction History of related U.S. Appl. No. 09/679,671, filed Oct. 5, 2000, entitled "Navigation System With Run-Time Training Instruction," now abandoned.

Transaction History of related U.S. Appl. No. 09/691,531, filed Oct. 18, 2000, entitled "Multiple Configurations for a Vehicle Navigation System," now U.S. Patent No. 6,385,542.

Transaction History of related U.S. Appl. No. 09/799,876, filed Mar. 6, 2001, entitled "Navigation System With Figure of Merit Determination," now U.S. Patent No. 6,741,928.

Transaction History of related U.S. Appl. No. 10/088,017, filed Sep. 9, 2002, entitled "Navigation System With User Interface," now U.S. Patent No. 6,873,907.

Transaction History of related U.S. Appl. No. 10/208,261, filed Jul. 31, 2002, entitled "Displaying Data," now U.S. Patent No. 6,748,323.

Transaction History of related U.S. Appl. No. 10/619,619, filed Jul. 16, 2003, entitled "Intelligent Modular Navigation Information Capability," now U.S. Patent No. 7,233,860.

Transaction History of related U.S. Appl. No. 11/327,450, filed Jan. 9, 2006, entitled "Smart Detour"

Transaction History of related U.S. Appl. No. 11/518,205, filed Sep. 11, 2006, entitled "Method and System of Securing Content and Destination of Digital Download Via the Internet."

Transaction History of related U.S. Appl. No. 11/675,817, filed Feb. 16, 2007, entitled "A Method of Generating Curved Baseline for Map Labeling."

Transaction History of related U.S. Appl. No. 11/684,301, filed Mar. 9, 2007, entitled "Method and Apparatus for Determining a Route Having an Estimated Minimum Fuel Usage for a Vehicle."

Transaction History of related U.S. Appl. No. 11/737,125, filed Apr. 18, 2007, entitled "Method and System Navigation Using Gps Velocity Vector ."

Transaction History of related U.S. Appl. No. 11/740,280, filed Apr. 25, 2007, entitled "Adjusting Spatial Operations Based on Map Density."

Transaction History of related U.S. Appl. No. 11/840,610, filed Aug. 17, 2007, entitled "Methods and Apparatus for Measuring the Effectiveness of Advertisements Presented on a Mobile Navigation Device."

Transaction History of related U.S. Appl. No. 11/844,321, filed Aug. 23, 2007, entitled "Rerouting in Vehicle Navigation Systems."

Transaction History of related U.S. Appl. No. 11/852,973, filed Sep. 10, 2007, entitled "Nearest Neighbor Geographic Search."

Transaction History of related U.S. Appl. No. 11/945,211, filed Nov. 26, 2007, entitled "System and Method of Providing Traffic Data to a Mobile Device."

Transaction History of related U.S. Appl. No. 11/967,889, filed Jan. 1, 2008, entitled "System and Method for Accessing a Navigation System."

Transaction History of related U.S. Appl. No. 12/013,384, filed Jan. 11, 2008, entitled "System and Method to Provide Navigational Assistance Using an Online Social Network."

Transaction History of related U.S. Appl. No. 12/016,949, filed Jan. 18, 2008, entitled "Method and Apparatus for Hybrid Routing Using Breadcrumb Paths."

Transaction History of related U.S. Appl. No. 12/016,980, filed Jan. 18, 2008, entitled "Method and Apparatus to Search for Local Parking."

Transaction History of related U.S. Appl. No. 12/016,982, filed Jan. 18, 2008, entitled "Method and Apparatus for Access Point Recording Using a Position Device."

Transaction History of related U.S. Appl. No. 12/188,139, filed Aug. 7, 2008, entitled "System and Method to Record a Present Trip."

Transaction History of related U.S. Appl. No. 12/192,018, filed Aug. 14, 2008, entitled "Route Navigation via a Proximity Point."

Transaction History of related U.S. Appl. No. 12/195,152, filed Aug. 20, 2008, entitled "Systems and Methods for Smart City Search."

International Patent Application Serial No. PCT/US2009/030176, Written Opinion and International Search Report, mailed Sep. 1, 2009.

USPTO Tranaction History of related U.S. Appl. No. 08/691,663, filed Aug. 2, 1996, entitled "Method Providing a Textual Description of a Remote Vehicle Location," now U.S. Patent No. 6,141,621.

USPTO Transaction History of related U.S. Appl. No. 08/691,727, filed Aug. 2, 1996, entitled "System and Method for Controlling a Vehicle Emergency Response Network," now U.S. Patent No. 6,539,301.

USPTO Transaction History of related U.S. Appl. No. 08/710,473, filed Sep. 18, 1996, entitled "Navigation Simulator and Recorder," now U.S. Patent No. 5,922,041.

USPTO Transaction History of relatedd U.S. Appl. No. 08/713,625, filed Sep. 13, 1996, entitled "Navigation System With Vehicle Service Information," now U.S. Patent No. 5,819,201.

USPTO Transaction History of related U.S. Appl. No. 08/713,627, filed Sep. 13, 1996, entitled "Navigation System With User Definable Cost Values," now U.S. Patent No. 5,878,368.

USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.

USPTO Transaction History of related U.S. Appl. No. 09/037,772, filed Mar. 10, 1998, entitled "Navigation System Character Input Device," now U.S. Patent No. 6,037,942.

USPTO Transaction History of related U.S. Appl. No. 09/056,218, filed Apr. 7, 1998, entitled "Navigation System using Position Network for Map Matching," now U.S. Patent No. 6,108,603.

USPTO Transaction History of related U.S. Appl. No. 09/062,518, filed Apr. 17, 1998, entitled "3- Dimensional Intersection Display for Vehicle Navigation System," now U.S. Patent No. 6,611,753.

USPTO Transaction History of related U.S. Appl. No. 09/096,103, filed Jun. 11, 1998, entitled "Navigation System With a Route Exclusion List System," now U.S. Patent No. 6,362,751.

USPTO Transaction History of related U.S. Appl. No. 09/099,963, filed Jun. 19, 1998, entitled "Autoscaling of Recommended Route," now U.S. Patent No. 6,574,551.

USPTO Transaction History of related U.S. Appl. No. 09/100,683, filed Jun. 19, 1998, entitled "Navigation System Map Panning Directional Indicator," now U.S. Patent No. 6,175,801.

USPTO Transaction History of related U.S. Appl. No. 09/114,670, filed Jul. 13, 1998, entitled "Navigation System Vehicle Location Display," now U.S. Patent No. 6,049,755.

USPTO Transaction History of related U.S. Appl. No. 09/118,030, filed Jul. 17, 1998, entitled "Navigation System With Predetermined Indication of Next Maneuver," now U.S. Patent No. 6,078,684.

USPTO Transaction History of related U.S. Appl. No. 09/160,068, filed Sep. 24, 1998, entitled "Navigation System With Anti-Alias Map Display," now U.S. Patent No. 6,163,269.

USPTO Transaction History of related U.S. Appl. No. 09/176,630, filed Oct. 22, 1998, entitled "Street Identification for a Map Zoom of a Navigation System," now U.S. Patent No. 6,178,380.

USPTO Transaction History of related U.S. Appl. No. 09/239,692, filed Jan. 29, 1999, entitled "Vehicle Navigation System With Location Based Multi-Media Annotation," now U.S. Patent No. 6,360,167.

USPTO Transaction History of related U.S. Appl. No. 09/418,749, filed Oct. 15, 1999, entitled "Navigation System With Road Condition Sampling," now U.S. Patent No. 6,484,089.

USPTO Transaction History of related U.S. Appl. No. 09/435,381, filed Nov. 5, 1999, entitled "Navigation System Character Input Device," now U.S. Patent No. 6,765,554.

USPTO Transaction History of related U.S. Appl. No. 09/470,438, filed Dec. 22, 1999, entitled "Navigation System With All Character Support," now U.S. Patent No. 6,256,029.

USPTO Transaction History of related U.S. Appl. No. 09/470,441, filed Dec. 22, 1999, entitled "Navigation System With Unique Audio Tones for Maneuver Notification," now U.S. Patent No. 6,363,322.

USPTO Transaction History of related U.S. Appl. No. 09/487,654, filed Jan. 19, 2000, entitled "Navigation System With Route Indicators," now U.S. Patent No. 6,430,501.

USPTO Transaction History of related U.S. Appl. No. 09/519,143, filed Mar. 6, 2000, entitled "Navigation System With Complex Maneuver Instruction," now U.S. Patent No. 6,397,145.

USPTO Transaction History of related U.S. Appl. No. 09/535,733, filed Mar. 27, 2000, entitled "Selective Rendering of Cartographic Entities for Navigation System," now U.S. Patent No. 7,170,518.

USPTO Transaction History of related U.S. Appl. No. 09/547,004, filed Apr. 11, 2000, entitled "Navigation System With Zoomed Maneuver Instruction," now U.S. Patent No. 6,529,822.

USPTO Transaction History of related U.S. Appl. No. 09/661,982, filed Sep. 18, 2000, entitled "Points of Interest for Navigation System," now U.S. Patent No. 6,374,180.

USPTO Transaction History of related U.S. Appl. No. 09/679,671, filed Oct. 5, 2000, entitled "Navigation System With Run-Time Training Instruction," now abandoned.

USPTO Transaction History of related U.S. Appl. No. 09/691,531, filed Oct. 18, 2000, entitled "Multiple Configurations for a Vehicle Navigation System," now U.S. Patent No. 6,385,542.

USPTO Transaction History of related U.S. Appl. No. 09/799,876, filed Mar. 6, 2001, entitled "Navigation System With Figure of Merit Determination," now U.S. Patent No. 6,741,928.

USPTO Transaction History of related U.S. Appl. No. 10/088,017, filed Sep. 9, 2002, entitled "Navigation System With User Interface," now U.S. Patent No. 6,873,907.

USPTO Transaction History of related U.S. Appl. No. 10/208,261, filed Jul. 31, 2002, entitled "Displaying Data," now U.S. Patent No. 6,748,323.

USPTO Transaction History of related U.S. Appl. No. 10/619,619, filed Jul. 16, 2003, entitled "Intelligent Modular Navigation Information Capability," now U.S. Patent No. 7,233,860.

USPTO Transaction History of related U.S. Appl. No. 11/327,450, filed Jan. 9, 2006, entitled "Smart Detour."

USPTO Transaction History of related U.S. Appl. No. 11/518,205, filed Sep. 11, 2006, entitled "Method and System of Securing Content and Destination of Digital Download Via the Internet."

USPTO Transaction History of related U.S. Appl. No. 11/675,817, filed Feb. 16, 2007, entitled "A Method of Generating Curved Baseline for Map Labeling."

USPTO Transaction History of related U.S. Appl. No. 11/684,301, filed Mar. 9, 2007, entitled "Method and Apparatus for Determining a Route Having an Estimated Minimum Fuel Usage for a Vehicle."

USPTO Transaction History of related U.S. Appl. No. 11/737,125, filed Apr. 18, 2007, entitled "Method and System Navigation Using Gps Velocity Vector ."

USPTO Transaction History of related U.S. Appl. No. 11/740,280, filed Apr. 25, 2007, entitled "Adjusting Spatial Operations Based on Map Density."

USPTO Transaction History of related U.S. Appl. No. 11/840,610, filed Aug. 17, 2007, entitled "Methods and Apparatus for Measuring the Effectiveness of Advertisements Presented on a Mobile Navigation Device."

USPTO Transaction History of related U.S. Appl. No. 11/844,321, filed Aug. 23, 2007, entitled "Rerouting in Vehicle Navigation Systems."

USPTO Transaction History of related U.S. Appl. No. 11/852,973, filed Sep. 10, 2007, entitled "Nearest Neighbor Geographic Search."

USPTO Transaction History of related U.S. Appl. No. 11/945,211, filed Nov. 26, 2007, entitled "System and Method of Providing Traffic Data to a Mobile Device."

USPTO Transaction History of related U.S. Appl. No. 11/967,889, filed Jan. 1, 2008, entitled "System and Method for Accessing a Navigation System."

USPTO Transaction History of related U.S. Appl. No. 12/013,384, filed Jan. 11, 2008, entitled "System and Method to Provide Navigational Assistance Using an Online Social Network."

USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."
USPTO Transaction History of related U.S. Appl. No. 12/016,982, filed Jan. 18, 2008, entitled "Method and Apparatus for Access Point Recording Using a Position Device."
USPTO Transaction History of related U.S. Appl. No. 12/188,139, filed Aug. 7, 2008, entitled "System and Method to Record a Present Trip."
USPTO Transaction History of related U.S. Appl. No. 12/192,018, filed Aug. 14, 2008, entitled "Route Navigation via a Proximity Point."
USPTO Transaction History of related U.S. Appl. No. 12/195,152, filed Aug. 20, 2008, entitled "Systems and Methods for Smart City Search."

* cited by examiner

STATIC AND DYNAMIC CONTOURS

BACKGROUND

The present invention relates to data processing by digital computer, and more particularly to static and dynamic contours.

Portable mapping devices, such as Global Positioning System (GPS) devices and Personal Digital Assistants (PDAs) are capable of displaying and manipulating digital maps. In addition to roads, streets, rivers, lakes and other geographic features, these maps often can display topographical information as well. Topographic maps are also commonly referred to as contour maps or topo maps.

Contour maps show topography, or land contours, using contour lines. Contour lines are curves that connect contiguous points of the same altitude. For example, every point on the marked line of 10 meter (m) elevation is 10 m above mean sea level. To determine differences in elevation between two points on a contour map, the contour interval, or distance in altitude between two adjacent contour lines, must be known, and this is typically given at the bottom of the map. In most cases, contour intervals are consistent throughout a map. Sometimes dashed contour lines are present; these represent half the noted contour interval.

Digital technology enables one to store in a computer and to manipulate a true three dimensional (3D) digital elevation model.

SUMMARY

The present invention provides methods and apparatus, including computer program products, for static and dynamic contours.

In general, in one aspect, the invention features a method including displaying a contour map to a user, the contour map rendered from a union of static contours and dynamic contours.

In embodiments, the static contours can include lines derived from a vector source database. The dynamic contours can include lines derived from a parameter source database that enables user-selection of a drawing of lines according to parameters.

The parameters can be selected from the group including map scale, contour interval parameters, and map density. The map scale can represent a relationship between distance on the contour map and a corresponding distance on the earth's surface.

In another aspect, the invention features a method including rendering a contour map including a union of static contours and dynamic contours, and displaying the contour map on a device to a user.

In embodiments, the device can include a Global Positioning System (GPS) device. The GPS device can include a processor coupled with an input device, memory, and the display, and the processor further coupled with a GPS receiver that is coupled with a GPS antenna.

The static contours can include lines derived from a vector source database. The dynamic contours can include lines derived from a parameter source database that enables user-selection of a drawing of lines according to parameters. The parameters can be selected from the group including map scale, contour interval parameters, and map density. the map scale can represent a relationship between distance on the contour map and a corresponding distance on the earth's surface.

In another aspect, the invention features Global Positioning System (GPS) device including a processor coupled with an input device, memory, and the display, and the processor further coupled with a GPS receiver that is coupled with a GPS antenna, the memory a vector source database, a parameter source database and a process to render a topographic map including static contour lines and dynamic contour lines.

In embodiments, the process can include displaying the topographic map to a user.

The static contours can include lines derived from the vector source database. The dynamic contours can include lines derived from the parameter source database that enables user-selection of a drawing of lines according to parameters. The parameters can be selected from the group including map scale, contour interval parameters, and map density.

The invention can be implemented to realize one or more of the following advantages.

Merging static and dynamic contour layers of topographic data to render a single contour map enable a user to experience the "best of both worlds." The static contours are more visually accurate and the dynamic contours supply the ability to perform vertical profiling and three dimensional (3D) rendering.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
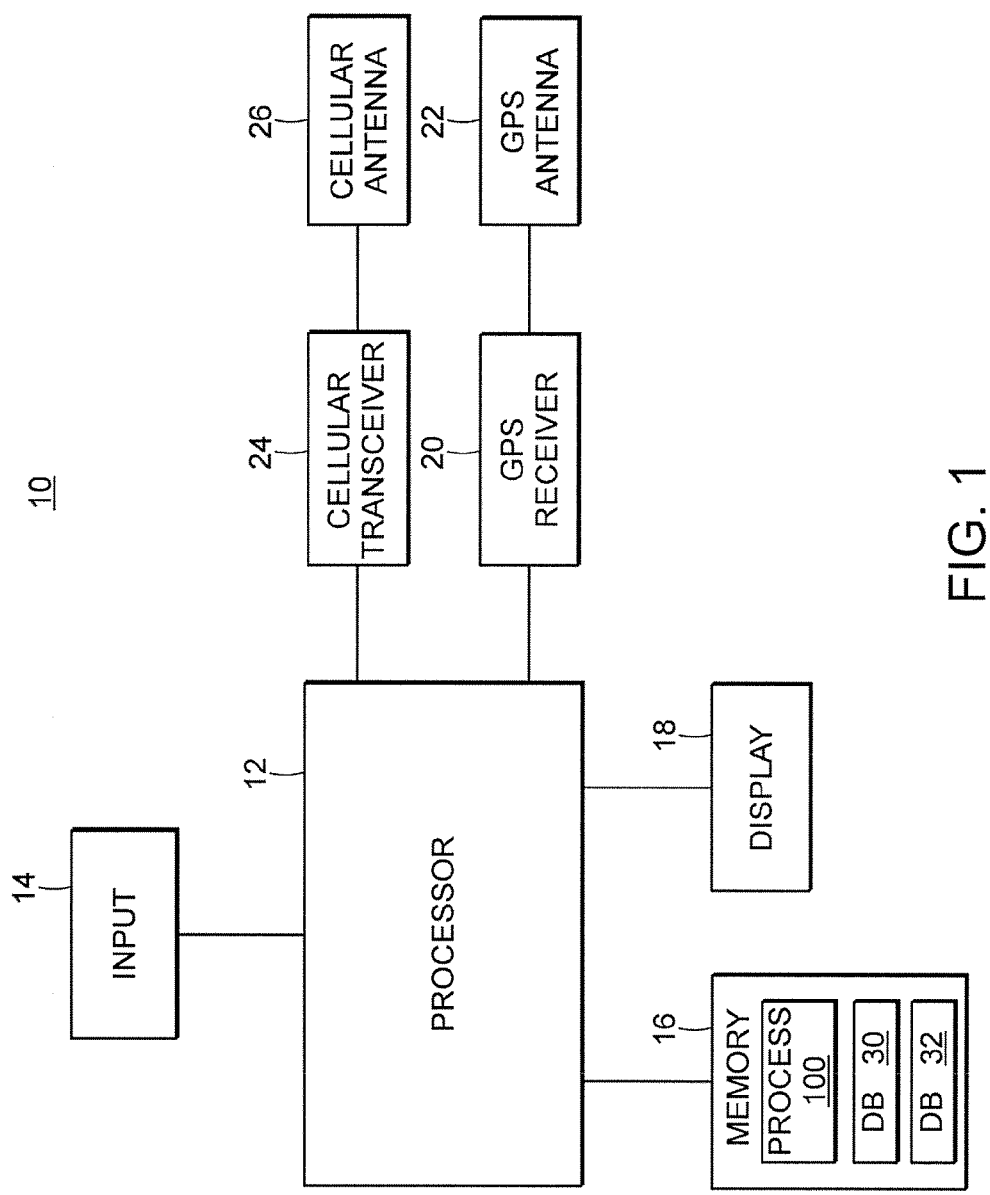
FIG. 1 is a block diagram of an exemplary portable Global Positioning System (GPS) device.

As shown in FIG. 1, an exemplary GPS device 10 includes a processor 12 coupled with an input device 14, memory 16, and a display 18. The processor 12 is further coupled with a GPS receiver 20 that is in turn coupled with a GPS antenna 22. The processor 12 may also be coupled with a cellular phone transceiver 24 and corresponding antenna 26. The input device 14 may include a keypad, switches, touch screen, voice-input (such as a microphone), mouse, joystick, and so forth.

Processor 12 typically accesses at least some form of computer-readable media. Computer-readable media may be any available media that is accessible by the GPS device 10. By way of example and not limitation, computer-readable media may include computer storage media and communications media. Computer storage media includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave or transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, radio frequency (RF), infrared and other wireless media. Combinations of any of the above would also be included within the scope of computer-readable media.

Memory 140 includes a contour map process 100. The contour map process 100 generates a contour map using data stored in a vector source database 30 and in a source database 32 including map scale data, contour interval parameter data, and map density data. The vector source database 30 and the source database 32 are stored in memory 22. The vector source database 30 includes vector data in the form of points and lines, that are geometrically and mathematically associated. Points are stored using coordinates, for example, a two-dimensional point is stored as (x, y). Lines are stored as a series of point pairs, where each pair represents a straight line segment, for example, (x1, y1) and (x2, y2) indicating a line from (x1, y1) to (x2, y2).

Figure 2:
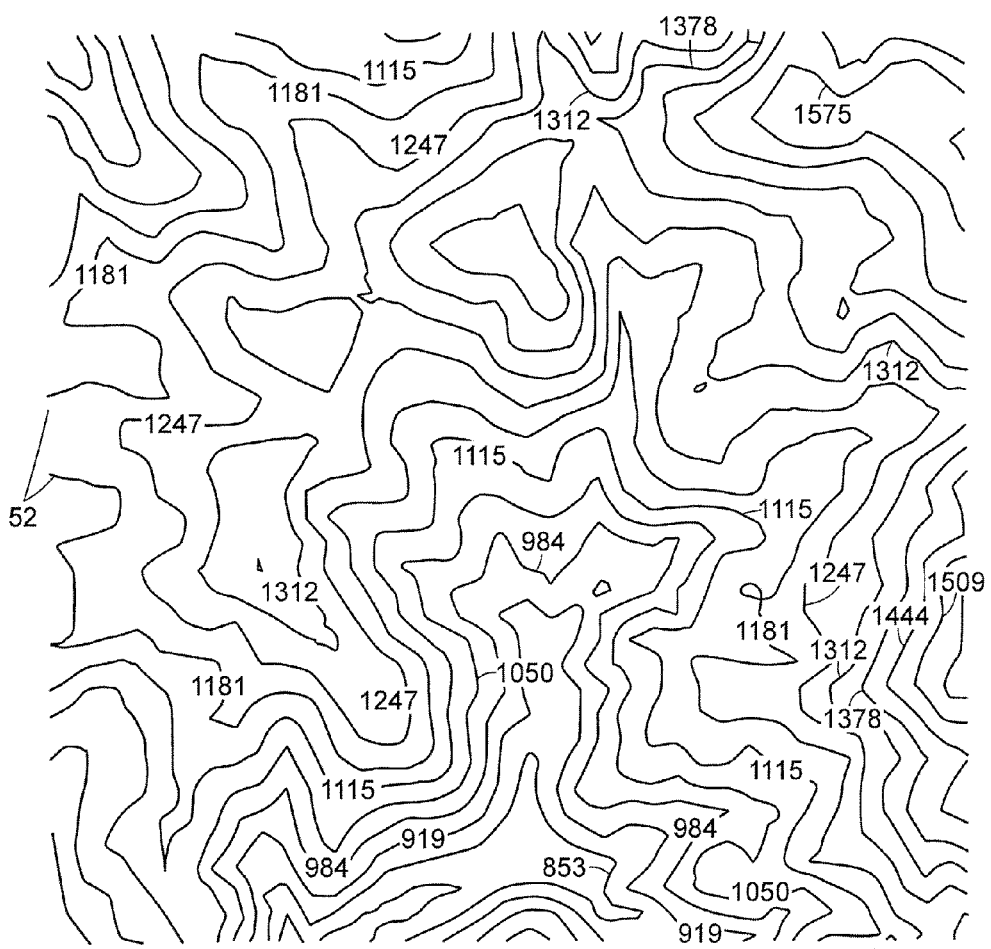
FIG. 2 is a block diagram of an exemplary contour map with static contours.

As shown in FIG. 2, an exemplary topographic map (also referred to as a contour map) 50 displays a geographic area. The contour map 50, generated by contour map process 100, uses static contour lines 52 to join points of equal elevation (height) and thus show valleys and hills, and the steepness of slopes.

In general, a contour line is a line on a topographic map connecting points of equal elevation above or below mean sea level. It is thus a kind of isopleth, or line of equal quantity. Contour lines are drawn on maps with a uniform interval of vertical distance separating them (usually 10, 20, 50, or 100 ft on American maps) and thus outline the landform configuration, or relief. They may be visualized as representing shorelines if sea level were raised in small increments. Thus, the tops of hills, which would appear as separate islands, are shown as a series of closed circular contours; valleys, which would appear as elongate bays, are shown as contour lines converging toward a point at the head of the valley. Since on steep slopes there is little horizontal distance between points greatly different in height, contour lines indicating such terrain are close together; contour lines of gentle slopes are more widely separated.

Maps employing contour lines are called contour, or relief, maps although they are popularly called topographic maps in the United States. Certain conventions are employed on these maps to assist a user. Contours indicating land elevations are printed in brown with every fifth contour drawn thicker and labeled with its elevation; those indicating depths of bodies of water are printed in blue. Hachure lines, pointing down slope, are attached to contour lines in order to emphasize a depression with a steep gradient. Contour maps are often constructed from stereographic aerial photographs and orbiting satellites data, which use radar to measure elevations for land or ocean relief maps.

Static contour lines are lines derived from a vector source database and are represented on the map 52 exactly as the vector source data dictates. A vector is a representation of the spatial extent of geographic features using geometric elements (such as point, curve, and surface) in a coordinate space. For example, if the source data contains lines at a 10 meter interval, the static contours drawn in the application present an exact replication of the geographic location of the lines.

Figure 3:
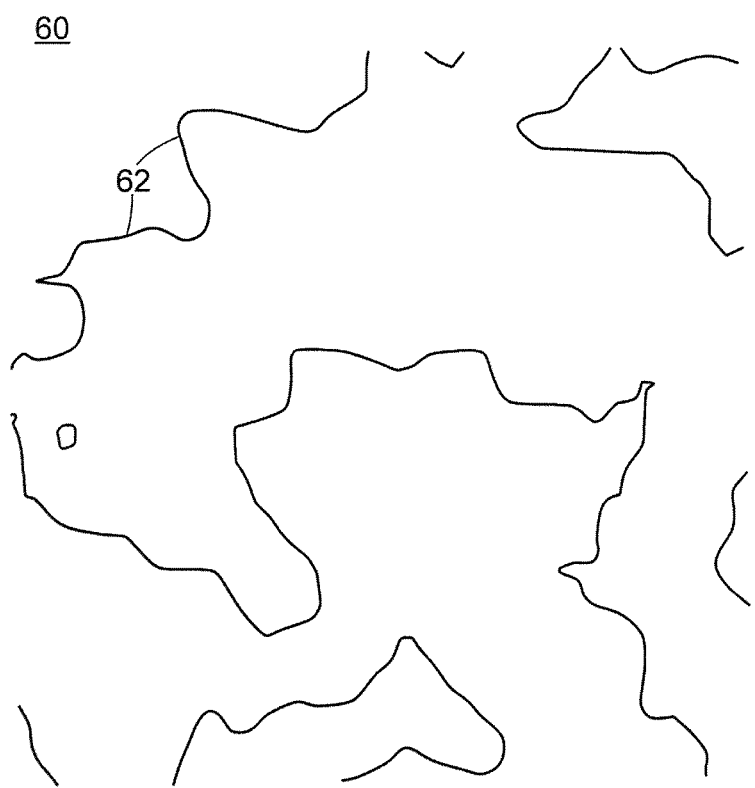
FIG. 3 is a block diagram of the exemplary contour map of FIG. 1 with dynamic contours.

As shown in FIG. 3, an exemplary topographic map 60 displays the same geographic area shown in FIG. 2 using contour map process 100 to generate dynamic contour lines 62. Dynamic contour lines 62 are lines drawn on a map that are derived from a source database the enables user selection of line drawing based on several application parameters, such as map scale, contour interval parameters, and/or map density.

Figure 4:
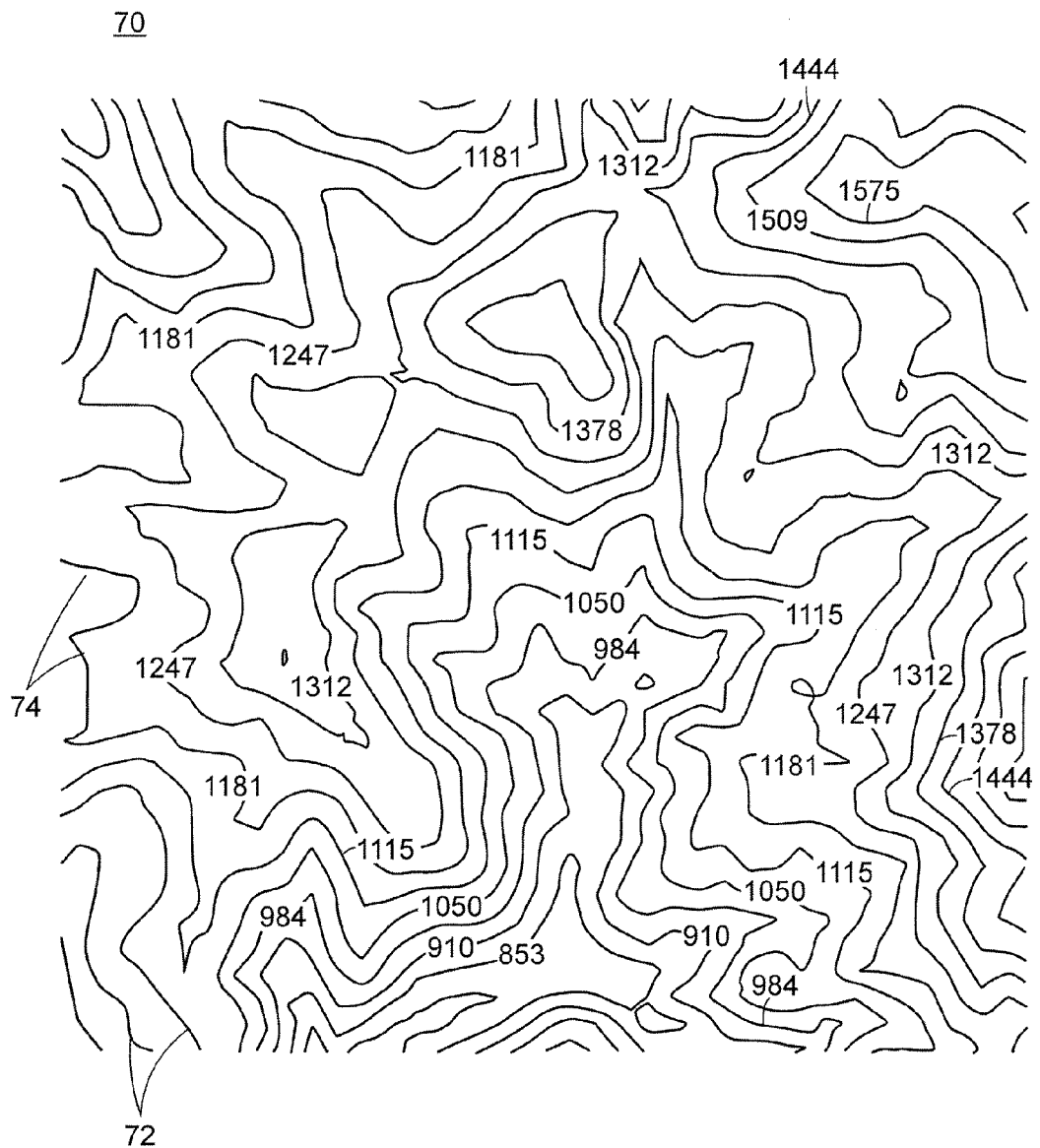
FIG. 4 is a block diagram of an exemplary contour map with a union of static and dynamic contours.

As shown in FIG. 4, an exemplary topographic map 70 generated by contour map process 100 displays the same geographic area shown in FIG. 2 and FIG. 3 using a union of static contour lines 72 and dynamic contour lines 74. More particularly, map 70 results from a merger of static contours and dynamic contours that enable a user to experience the best that static contours have to offer combined with the best that dynamic contours have to offer. Here, the static contours 72 are more visually accurate and the dynamic contours enable an ability for the application to perform vertical profiling and three dimensional (3D) rendering.

In general, a topographic map can include a dynamic topo layer (i.e., blx, a blank compression/expansion layer). An application developer can choose to make this dynamic topo layer "visible" or "invisible." If dynamic contours is "visible," standard contour drawing parameters apply. If the dynamic contours is "invisible" and a static contour vector layer is present, the contour drawing will be based on the user-defined layer drawing parameters and dynamic contours will not be drawn, but used for 3D rendering and vertical profiling.

Figure 5:
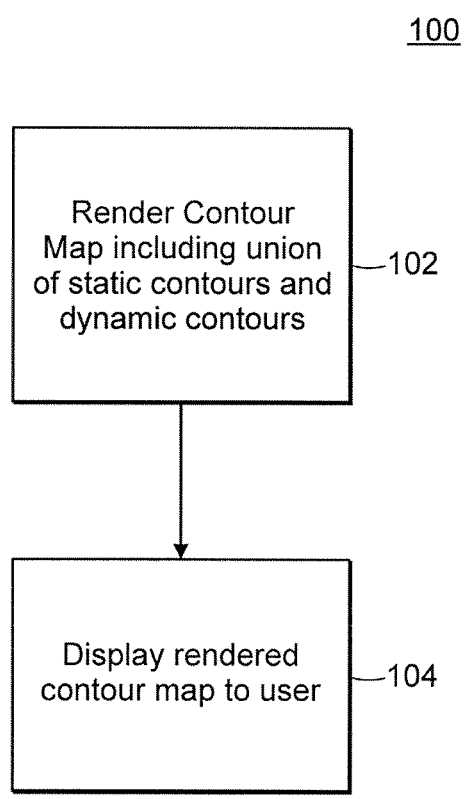
FIG. 5 is flow diagram.

As shown in FIG. 5, process 100 includes rendering (102) a contour map including a union of static contours and dynamic contours. The static contours can include lines derived from a vector source database. The dynamic contours can include lines derived from a parameter source database that enables user-selection of a drawing of lines according to parameters. The parameters can be selected from the group including map scale, contour interval parameters, and map density. The map scale can represent a relationship between distance on the contour map and a corresponding distance on the earth's surface.

Process 100 displays (104) the contour map on a device to a user. The device can include a Global Positioning System (GPS) device. The GPS device can include a processor coupled with an input device, memory, and the display, and the processor further coupled with a GPS receiver that is coupled with a GPS antenna.

The parameters can be selected from the group including map scale, contour interval parameters, and map density. The map scale can represent a relationship between distance on the contour map and a corresponding distance on the earth's surface.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
  displaying a contour map to a user on a display of an electronic device, the contour map being rendered by a processor of the electronic device from a union of static contours and dynamic contours, the static contours and the dynamic contours representing specific elevations, wherein the static contours comprise elevation lines derived from a vector source database and the dynamic contours comprise elevation lines derived from a parameter source database that enables user-selection of a drawing of elevation lines according to parameters selected by the user; and
  setting a visible property of the dynamic contours to make the dynamic contours visible or invisible, wherein when the dynamic contours are visible the dynamic contours are displayed simultaneously with the static contours on the contour map, and when the dynamic contours are invisible the dynamic contours are not displayed on the contour map and the dynamic contours are used for three dimensional rendering and vertical profiling in the contour map.

2. The method of claim 1 wherein the parameters are selected from the group consisting of map scale, contour interval parameters, and map density.

3. The method of claim 2 wherein the map scale represents a relationship between distance on the contour map and a corresponding distance on the earth's surface.

4. A method comprising:
  rendering a contour map with a processor of an electronic device, the contour map comprising a union of static contours and dynamic contours, the static contours and the dynamic contours representing specific elevations, wherein the static contours comprise elevation lines derived from a vector source database and the dynamic contours comprise elevation lines derived from a parameter source database that enables user-selection of a drawing of elevation lines according to parameters selected by a user;
  setting a visible property of the dynamic contours to make the dynamic contours visible or invisible, wherein when the dynamic contours are visible the dynamic contours are displayed simultaneously with the static contours on the contour map, and when the dynamic contours are invisible the dynamic contours are not displayed on the contour map and the dynamic contours are used for three dimensional rendering and vertical profiling in the contour map; and
  displaying the contour map to the user on a display of the electronic device.

5. The method of claim 4 wherein the electronic device is a Global Positioning System (GPS) device.

6. The method of claim 5 wherein the GPS device comprises:
  the processor coupled with an input device, memory, and the display; and
  the processor coupled with a GPS receiver, which in turn is coupled with a GPS antenna.

7. The method of claim 4 wherein the parameters are selected from the group consisting of map scale, contour interval parameters, and map density.

8. The method of claim 7 wherein the map scale represents a relationship between distance on the contour map and a corresponding distance on the earth's surface.

9. A Global Positioning System (GPS) device comprising:
  a processor coupled with an input device, memory, and the display; and
  the processor linked to a GPS receiver coupled with a GPS antenna, the memory including a vector source database, a parameter source database and a contour map process to render a topographic map comprising static contour lines and dynamic contour lines, the static contour lines and the dynamic contour lines representing specific elevations, wherein the static contours comprise elevation lines derived from the vector source database and the dynamic contours comprise elevation lines derived from the parameter source database that enables user-selection of a drawing of elevation lines according to parameters selected by a user;
  wherein a visible property of the dynamic contours is set to make the dynamic contours visible or invisible, wherein when the dynamic contours are visible the dynamic contours are displayed simultaneously with the static contours on the contour map, and when the dynamic contours are invisible the dynamic contours are not displayed on the contour map and the dynamic contours are used for three dimensional rendering and vertical profiling in the contour map.

10. The GPS device of claim 9 wherein the process further comprises displaying the topographic map to a user.

11. The GPS device of claim 9 wherein the parameters are selected from the group consisting of map scale, contour interval parameters, and map density.

* * * * *